US008596424B2

(12) United States Patent
Rauscher et al.

(10) Patent No.: US 8,596,424 B2

(45) Date of Patent: Dec. 3, 2013

(54) LOCKING DEVICE FOR LOCKING A MOTOR VEHICLE PART

(75) Inventors: Matthias Rauscher, Rauenstein (DE); Hartmut Beyersdorfer, Coburg (DE); Uwe Klippert, Roedental (DE)

(73) Assignee: Brose Fahrzeugteile GmbH & Co. KG, Coburg, Coburg (DE)

( * ) Notice: Subject to any disclaimer, the term of this patent is extended or adjusted under 35 U.S.C. 154(b) by 494 days.

(21) Appl. No.: 12/881,117

(22) Filed: Sep. 13, 2010

(65) Prior Publication Data

US 2011/0061199 A1 Mar. 17, 2011

(30) Foreign Application Priority Data

Sep. 14, 2009 (DE) ......................... 10 2009 041 498

(51) Int. Cl.
*F16D 55/16* (2006.01)

(52) U.S. Cl.
USPC .......................................... 188/72.7; 188/156

(58) Field of Classification Search
USPC .................. 16/334, 337, 342; 188/72.7–72.9, 188/156–164; 192/12 B; 292/201, 216, 196; 318/466, 685
See application file for complete search history.

(56) References Cited

U.S. PATENT DOCUMENTS 2,893,506 A 7/1959 Daugirdas
3,061,362 A 10/1962 Maruyama
4,628,568 A 12/1986 Lee et al.
4,652,781 A * 3/1987 Andrei-Alexandru et al. . 310/83
4,995,194 A 2/1991 Schultze et al.
5,873,622 A * 2/1999 Kluting et al. ........... 296/146.11
6,125,768 A 10/2000 Kurnik
6,193,022 B1 * 2/2001 Bode ............................. 188/2 D
6,473,936 B2 11/2002 Orita
6,805,227 B2 * 10/2004 Schunke et al. ............ 192/12 B
6,848,759 B2 2/2005 Doornbos et al.

(Continued)

FOREIGN PATENT DOCUMENTS

JP 60-118028 8/1985
JP 2006-290296 A 10/2006
JP 2007-321365 A 12/2007

OTHER PUBLICATIONS

Office action dated Jan. 24, 2012 for U.S. Appl. No. 12/881,113, 9 pages.

(Continued)

*Primary Examiner* — Christopher Schwartz
(74) *Attorney, Agent, or Firm* — Christie, Parker & Hale, LLP

(57) ABSTRACT

A locking device for locking a displaceable motor vehicle part which is lockable by the means of the locking device within a displacement range in a respective rest position reached by displacement is provided. The locking device comprising a braking device with at least two braking elements which interacts in a braking manner in a respective rest position of the motor vehicle part in order to lock the motor vehicle part. An actuator is assigned to the locking device, which is optionally combinable with the braking device and with which a displacement movement of the motor vehicle part is brakable for locking the motor vehicle part. The actuator is operatively connected independently on the braking device with a component which can be moved by displacement of a motor vehicle part so that a displacement movement of the displaceable motor vehicle part is brakable by the action of an actuator on the component.

19 Claims, 9 Drawing Sheets

(56) References Cited

U.S. PATENT DOCUMENTS

| | | | | |
|---|---|---|---|---|
| 7,413,061 | B2 * | 8/2008 | Wagner et al. | 188/72.9 |
| 8,480,155 | B2 | 7/2013 | Rauscher et al. | |
| 2001/0038271 | A1 * | 11/2001 | Mauel et al. | 318/445 |
| 2001/0048227 | A1 * | 12/2001 | Kachouh | 292/216 |
| 2006/0070830 | A1 * | 4/2006 | Fuderer et al. | 188/196 V |
| 2006/0117878 | A1 | 6/2006 | Spurr | |
| 2007/0068748 | A1 * | 3/2007 | Chittka | 188/72.7 |
| 2010/0101900 | A1 * | 4/2010 | Usui | 188/156 |
| 2010/0192328 | A1 * | 8/2010 | Scheck et al. | 16/342 |
| 2011/0061200 | A1 * | 3/2011 | Rauscher et al. | 16/337 |

OTHER PUBLICATIONS

Final Rejection dated Aug. 29, 2012 for U.S. Appl. No. 12/881,113, 12 pages.

Japanese Examination Report for Japanese Patent Application No. 2010-204917, 4 sheets and English translation, 4 sheets.

* cited by examiner

LOCKING DEVICE FOR LOCKING A MOTOR VEHICLE PART

CROSS-REFERENCE TO A RELATED APPLICATION

This application claims priority to and the benefit of German Patent Application Number 10 2009 041 498.3, filed on Sep. 14, 2009, the entire contents of which are incorporated herein by reference.

BACKGROUND

The invention relates to a locking device for (detachable) locking a displaceable motor vehicle part (in respect to the motor vehicle structure), which is lockable by means of the locking device within a displacement range in a respective rest position reached by displacement.

In the present case the displacement range of the motor vehicle part has to be understood as a range, in which the motor vehicle part is in each case lockable in different positions (optionally continuously variable). This displacement range does not necessarily have to comprise the complete possible range of motion of the motor vehicle part. The motor vehicle door can be, for instance only locked in a respective partially opened position obtained by displacing or pivoting, if—out from the closed position of the motor vehicle door—a certain pivot angle was scanned. Hereby an unintended braking should be avoided during a closing process of the motor vehicle door in the last part of the closing motion.

Said locking device comprises a braking device with at least two braking elements which interact in a braking manner in a respective rest position of the motor vehicle part, for instance laying against each other under conditions of static friction, for locking the motor vehicle part in a previously adopted position and which can be brought in a position without braking engagement during a displacement of the motor vehicle part so that they can be moved towards each other.

The displaceable motor vehicle part can be in particular a deflectable part of a motor vehicle, like for instance a motor vehicle door (side or tail gate door), storage flap, fuel tank flap or also an adjustable outside mirror.

The locking device should provide a possibility to be able to lock (removable) a displaceable motor vehicle part in a displacement range in a multitude of respective intermediate position such that unintended external effects like for instance a gust or an accidentally touching of the motor vehicle part does not lead to a further displacement of the motor vehicle part. Herewith a collision of the vehicle part with neighbouring motor vehicles, lamp posts or other obstacles shall be prevented. On the other side, the motor vehicle part (for instance for a further pivoting or a return) should be displaceable, if a person acts on the displaceable motor vehicle part (exerting a release force or a release moment) by overcoming the braking force or a herewith related braking moment existing in the rest position of the motor vehicle part.

The motor vehicle door should be for instance in each case lockable in a number of pivot positions between the completely locked position and the completely opened position such that an unattended acting on the motor vehicle door, for instance by a gust, does not lead to a change of the present (partly opened) position of the motor vehicle door. However, a vehicle driver or a passenger should simultaneously also be able to bring a partially opened motor vehicle door by acting on it again into the closed position or to open it further.

A locking device of the mentioned kind is for instance known from WO 2009/007400 A1, wherein the braking device is designed as friction brake comprising two friction elements movable towards each other, which lay against each other in a respective rest position of the motor vehicle part under conditions of static friction for locking the motor vehicle part and which are moved towards each other in case of a displacement of the motor vehicle part, whereby they slide against each other under sliding friction conditions.

For this kind of locking devices an unintended collision of the displaceable motor vehicle part with an obstacle located in the surrounding like for instance a further motor vehicle part, a roadside tree, a street lamp or such, can then not be avoided if an operating person actively moves the respective motor vehicle part towards said obstacle, perhaps since the obstacle was overlooked or the acting force onto the motor vehicle part was underestimated.

SUMMARY

The object of the invention is therefore to improve a locking device of the previous mentioned kind for avoiding collisions between the displaceable motor vehicle part and an obstacle located in the surrounding area.

According to an exemplary embodiment of the invention an actuator is assigned to the locking device, which is optionally combinable with the braking device and with which a displacement movement of the motor vehicle part is brakable for locking the motor vehicle part, so that the motor vehicle part can also then be locked if a force or a moment acts on it, which is suitable to release the locking effect of the first braking device (for instance in form of a friction brake), whereby the actuator in the activated status acts independently from the braking elements of the first barking device onto a component movable by displacement of a motor vehicle part, for instance onto a shaft section coupled to the displaceable motor vehicle part or also onto a component of the displaceable motor vehicle part itself for braking and locking the displaceable motor vehicle part.

This means, the actuator has its own braking means assigned to it, which act independently from the first braking device and can be integrated together with the actuator in an additional braking module. Several braking principles can be basically applied for causing a braking effect when activating the actuator. The actuator can be advantageously electrically operated and interacts with the second braking device, which exerts a mechanical (force and/or form fit) braking or holding effect for locking the displaceable motor vehicle part, as for instance a wrap spring.

According to another exemplary embodiment of the invention an interface is provided on the locking device for optionally coupling such an actuator.

It can be further provided that the actuator is used in order to release a locked door for a displacement in the first place, if—for instance by the means of assigned sensors—it was recognized that no obstacles exist in the surrounding with which a collision might occur.

The actuator can be electrically actuated and/or be operated and can be for instance provided as an electromotive motor or as a lifting magnet. Furthermore, the actuator can be operatively connected with at least one detector or sensor, which detects the surrounding area of the displaceable motor vehicle part, and activates the actuator, if the risk of an upcoming collision between the displaceable motor vehicle part and an obstacle located in the surrounding area arises by evaluation of the sensor signals. Thereby at least one detector or sensor assigned to the actuator can also serve for monitoring such areas in the surroundings of the displaceable motor vehicle part (also towards the motor vehicle interior), in which the danger of clamping of objects or body parts consists if the motor vehicle part is being displaced. An example is the door frame in case of a motor vehicle part designed as a motor vehicle door, in which a clamping of objects or body parts (in particular limps) of a vehicle user can occur while closing the door. By monitoring the surrounding area of the respective motor vehicle part, for instance in the area of the door frame in case of a vehicle door, by means of a sensor during displacement of the motor vehicle part immanent clamping conditions can be recognised, where upon a clamping by activating the actuator and a concurring braking of the displaceable movement of the respective motor vehicle part is avoided. The actuator serves in this case as an anti-clam protection for preventing the clamping of objects or body parts by a displaceable motor vehicle part.

The locking device is designed such that the first braking device can lock the displaceable motor vehicle part independently on the activation of the additional actuator within the displacement range in a respective rest position reached by displacement, so that the first braking device is fully operable without the actuator.

Thereby it can be provided that the motor vehicle part locked by means of the first braking device is displaceable (for instance for a further deflection or for a return), if a person acts onto the displaceable motor vehicle part by overcoming the braking force or a herewith connected braking moment existing in the rest position of a motor vehicle part (exerting a releasing force or a releasing moment).

The actuator is part of an additional braking module with which the locking device can be optionally equipped if an up-scaled configuration of the locking device is desired, which offers an additional collision protection.

In order to be able to move the displaceable motor vehicle part if necessary also if the additional braking module is active, for instance in an emergency, the braking force exerted by the extra-braking module or the braking moment connected herewith can be over pressed by strong direct force impact onto the displaceable motor vehicle part.

According to an exemplary embodiment of the invention, the first braking device is arranged on a carrier, like for instance a hinge element or door holding angel of the motor vehicle part, which according to an improvement can serve simultaneously for retaining an additional module comprising the actuator, and preferably in the manner that a carrier can be equipped optionally with an additional module. A fixation of the first braking device on the carrier is therefore effective independently if the additional module is provided or not.

According to an exemplary variant of the invention the actuator can be coupled with one of the two braking elements of the first braking device in such a manner that by activating the actuator the two braking elements are engaged with each other in order to be able to brake a displaceable motor vehicle part doing a displacement.

According to a further exemplary variant of the invention the actuator acts in the activated condition independently from the braking elements of the first braking device on to a displaceable component movable together with the displaceable motor vehicle part, as for instance a shaft section coupled to the displaceable motor vehicle part for braking and locking the displaceable motor vehicle part.

In this case, the actuator is designed with its own braking means, which act independently on the first braking device and can be integrated together with the actuator in an additional braking module. Several braking principles can be basically applied for causing a braking effect when activating the actuator. The actuator can be advantageously electrically operated and interacts with the second braking device, which exerts a mechanical (force and/or form fit) braking or holding effect for locking the displaceable motor vehicle part, as for instance a wrap spring.

The additional braking module comprises besides the actuator specifically at least one braking means, as for instance a wrap spring, which can lock the displaceable motor vehicle part by mechanical action, mainly by force or frictional fit and/or form fit as well furthermore a coupling mechanism, which for instance has a flexible pulling means, a lever, an element having toothing or other transmission elements via which the actuator is operatively connected with the braking means.

The components of the additional braking module, thus the actuator, the braking means and the assigned coupling mechanism can also be combined (for instance by a common arrangement in and/or at a housing) to a module such that they can be added as a pre-fabricated unit (optional) to a locking device.

BRIEF DESCRIPTION OF THE DRAWINGS

Further details and advantages of the invention are becoming clear in the following description of the examples by reference to the figures.

DETAILED DESCRIPTION

Figure 5A:
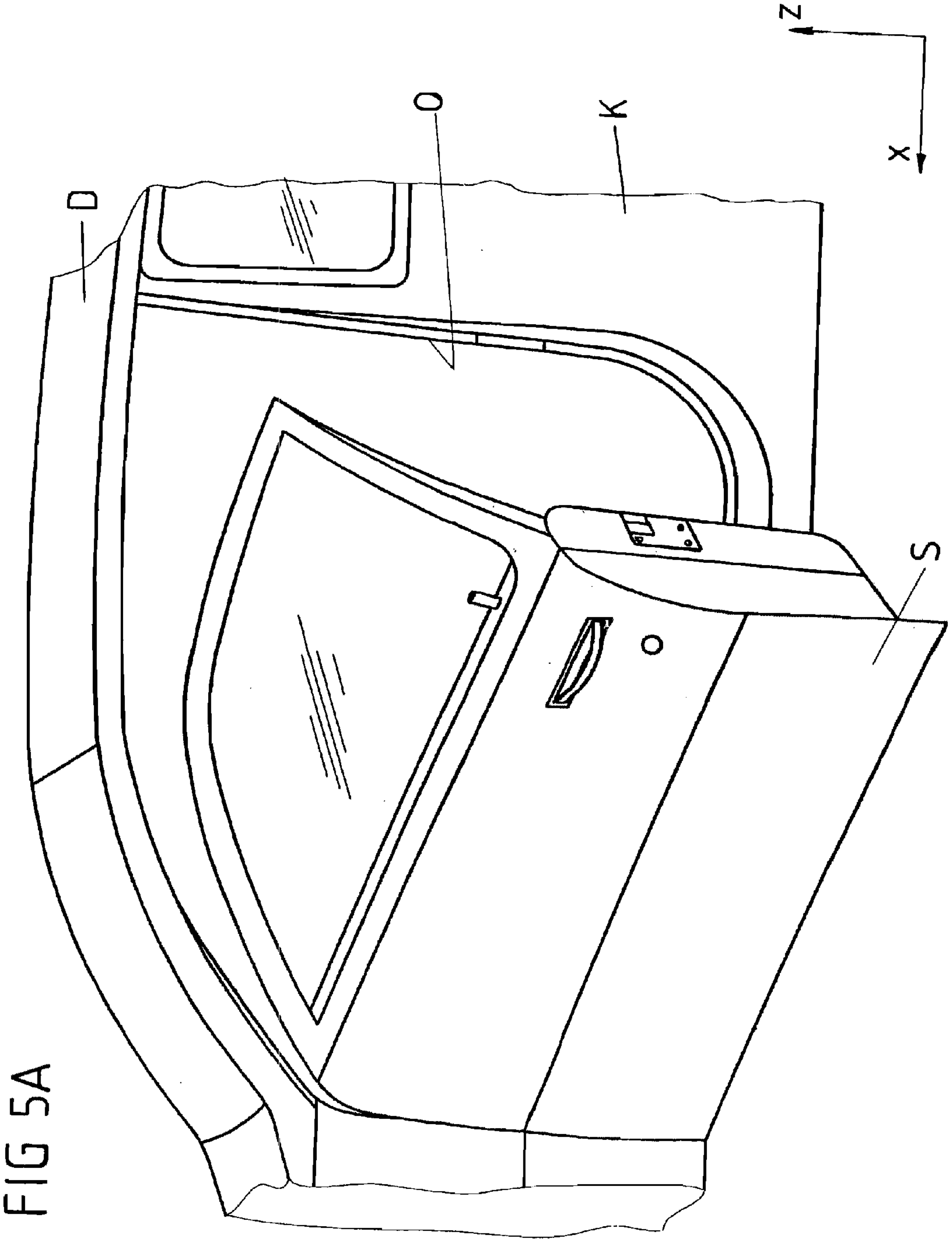
FIG. 5A a perspective illustration of the lateral vehicle structure of a motor vehicle with an opened motor vehicle door.

FIG. 5A shows a section of the lateral vehicle structure (car body K) of a motor vehicle which defines and encloses together with the roof section D of the motor vehicle a door opening O through which a passenger can enter the interior of the motor vehicle. For closing the door opening O, a displaceable or deflectable motor vehicle part in form of the foldable side door S is provided which is shown in FIG. 5A in a partially outwardly folded position. The folding down of a side door S of a motor vehicle from the vehicle structure K into an only partially outwardly folded position occurs for instance regularly if adjacent to the motor vehicle a third motor vehicle is parked, so that the side door S cannot be opened in an arbitrary manner without colliding with the third vehicle. It is then important that the side door S is locked in the partially opened position so that it is not further opened by a gust or an unintended touching by a passenger since through this it could collide with the adjacent third vehicle. For this reason, so-called locking devices are provided with which a side door S is lockable in a partially opened position.

Figure 5B:
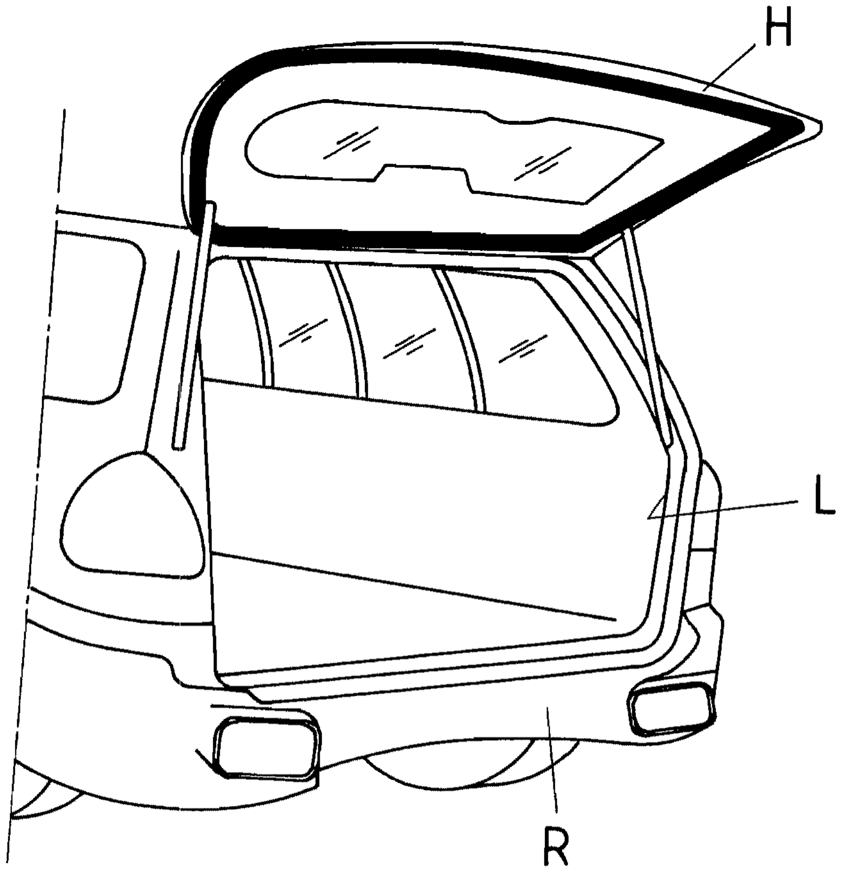
FIG. 5B a perspective illustration of the rear side of a motor vehicle with an opened tailgate door.

FIG. 5B shows that locking devices of the mentioned kind cannot only be provided in side doors of a motor vehicle but for instance also in a tailgate door or tailgate flap H serving on a rear end R of a motor vehicle and serving to close a storage area L. Further possible application areas are trunk flaps, engine flaps, sliding doors, adjustable loading floors, blinds and other motor vehicle parts which are displaceable (deflectable) in respect to a structural unit of the motor vehicle. In the following, displaceable motor vehicle parts are generally discussed whereby in particular pivotable (foldable) but also slidable motor vehicle parts should be included.

Figure 6A:
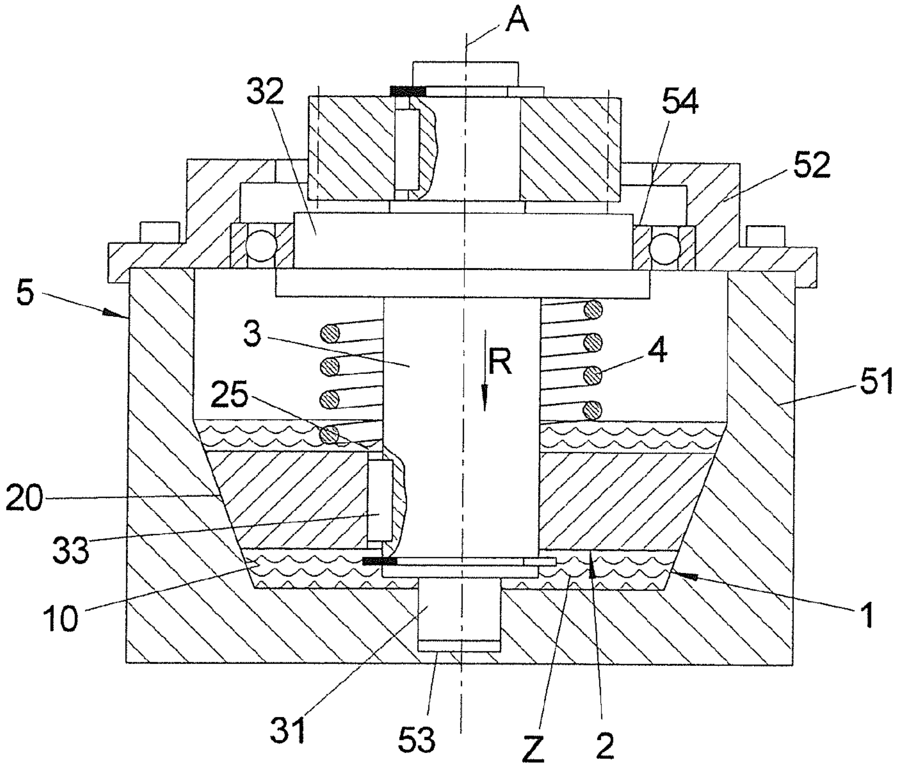
FIG 6A Prior Art
FIG. 6A in embodiment of a known locking device with braking device and without additional braking module.

FIG. 6A shows a cross-section of a first embodiment of a locking device via which a deflectable motor vehicle part, as for instance a side door according to FIG. 5A or a tailgate door according to FIG. 5B or a sliding door, are lockable in a partially deflected position.

The locking device comprises a braking device 5 with a lower housing part 51 and an upper housing part 52 which are attached to each other by means of suitable attaching means, for instance in form of screws or nuts. In the housing 51, 52 two friction elements 1, 2 are arranged as braking elements which can be brought into an engagement with each other via the friction areas 10, 20 facing each other in order to be able to lock a deflectable motor vehicle part continuously in a partially deflected position by the thereby appearing (static) friction.

The first friction element 1 is formed by a section of the inside wall of the housing 51, 52, more precise, a section of the inside wall of the lower housing part 51, which is formed rotationally symmetric in respect to a housing axis A and which defines or forms a friction area 10 conically tapering towards the housing floor of the lower housing part 51. Thus, the first friction element 1 is designed by fixing to the housing in such a manner that its conically tapering friction area 10 which is rotationally symmetric in respect to the housing axis A forms an immediate part of a circumferential inner inside wall of the housing 51, 52. Alternatively, a first friction element fixed to the housing can be for instance also realised by fixing a friction element which is separate from the inside wall of the housing in the interior of the housing.

The (disc shaped) second friction element 2 is arranged torque-proved on a shaft 3 which is rotatably arranged on its two ends 31, 32 in a respectively designated bearing 53 or 54 of the housing 51, 52, and its rotational axis A collides with the housing axis in respect to which the first friction element 1 is rotationally symmetric formed. The second friction element 2 is also (apart from a structuring of its friction area) basically formed rotationally symmetrically in respect to third axis A and tapers—like the first friction element 1—towards the housing floor (provided in the lower housing part 51). The second friction element 2 defines thereby a conical friction area 20 on its outer periphery which opposes the conical friction area 10 of the first friction element 1 and can be brought into engagement with this in a friction locking manner.

In order to engage the friction area 10, 20 of the two friction elements 1, 2 with each other in a friction locked manner, an elastic element 4 in form of a spring, more exact a coil spring designed as a pressure spring, is provided, which encompasses the shaft 3 and which is supported on the one hand by a broadened end section 32 of the shaft 3 and on the other hand by the second friction element 2, namely such that it tends to brace the second friction element 2 against the first friction element 1 and engages thereby the two friction areas 10, 20 with each other. In other words, the effective direction R of the forces or pre-load applied by the pre-loaded elastical element 4 is such that it extends along the shaft 3 or its axis A and the second friction element 2 is braced along this direction R against the first friction element 1.

In order to allow an axial movement of the rotating second friction element 2 being arranged on the shaft 3 so that this can be brought into an engagement in a defined manner along the effective direction R of the pre-load of the elastical element 4 with the friction element 10 of the first friction element 1, the rotationally fixed positioning of the second friction element 2 on the corresponding shaft 3 occurs via interlocking form fit areas 25, 33 of the friction element 2 and the shaft 3, which allows an actual movement of the second friction element 2 along the axis A of the shaft 3 (and therefore also the housing axis colliding with it). In concrete the form fitting areas 25, 33 form here exemplary a groove spring connection with a groove 25 provided on the second friction element 2 which extends along the shaft axis A and with the corresponding spring 33 in form of a projection which sticks out from the shaft 3 outwardly into the groove 25.

The form fitting area 33 in form of a spring sticking outwardly from the shaft 3 engages into the corresponding form fitting area 25 in form of a groove of the second friction element 2 in such a manner that the second friction element 2—except of the rotation angle plate optionally present—is rotationally fixed arranged on the shaft 3, which however is limited movable—by the effect of the preload of the elastical element 4—along the axis A, whereby the (maximum) possible extend of the movement is limited in such that the second friction element 2 is pressed by the effect of the preload of the elastical element 4 with its friction area 20 against the corresponding friction area 10 of the first friction element 1.

Due to its axial movable position, the second friction element 2 can be moved (automatically) by the effect of the preload of the elastical element 4 such that it—also after long operation times of the locking device and the connected wearing out—is always engaged in a defined manner with the corresponding friction area 10 of the first friction element 1. The tracking occurs thereby automatically under the effect of the preload of the elastical element 4 and by using the axial movability of the second friction element 2 along the shaft 3.

The material for the friction areas 10, 20 of the two friction elements 1, 2 is selected such that the two friction areas 10, 20 produce, if they are engaged with each other by the effect of the preload of the elastical element 4, a sufficiently large static friction in order to be able to lock a motor vehicle part partially deflected in respect to the vehicle structure in its deflected position by the means of the locking device. Suitable material combinations for the two friction areas 10, 20 were provided previously. Presently it can be assumed that the two friction areas 10, 20 are made of POM (Polyoxymethylen), respectively.

Besides a reliable locking of a deflected motor vehicle part the locking brake shall furthermore also allow a smooth deflection of the corresponding motor vehicle part; that means the friction forces acting between the two friction areas

10, 20 of the friction elements 1, 2 have to be as low as possible in case of a relative movement of the two frictional areas 10, 20 towards each other. In other words expressed, the dynamic friction acting between the two frictional areas 10, 20 shall be significantly lower, possibly much less lower, than the (static) static friction acting between the two frictional areas 10, 20 if the second frictional element 2 is braced in rest position against the first frictional element 1 by the elastical element 4.

The movement of the second frictional element 2 during deflection of a corresponding motor vehicle part to be locked by the means of the locking brake, for instance a side door or a tailgate door of a motor vehicle, is thereby triggered that the shaft 3 on which the second frictional element 2 is rotationally fixed arranged, is coupled to said deflectable motor vehicle part, namely such that a deflection of said motor vehicle part for instance a vehicle door, is transferred into a rotational movement of the shaft 3 around its axis A. For this the shaft 3 can on the one hand engage directly on a pivot axis around which a deflectable motor vehicle part is being pivoted, or a gear can precede the shaft 3 over which a deflection of the corresponding motor vehicle part is transferred into a rotational movement of the shaft. Such a gear can for instance cause a defined transmission (for increased velocities of the second frictional element) or also a directional deflection for instance around the shaft 3 in a determined spatial direction.

As a result, the second frictional element 2 has to be coupled via the corresponding shaft 3 with a corresponding, deflectable motor vehicle part, for instance a vehicle door, such that a deflection of said motor vehicle part causes a rotational movement of the shaft 3.

The other, first frictional element 1 has then to be fixed in respect to the vehicle structure such that it cannot rotate together with the shaft 3. This can in particular be achieved if the housing 5 on which inside wall the first frictional element 1 is formed with its frictional area 10 is arranged on the side of the structure of the vehicle, for instance in the frame of a vehicle door assigned to the locking device.

Thus, in the result a deflection movement of the deflectable motor vehicle part assigned to the locking device leads to a distortion of the second frictional element 2 by the means of the shaft 3 around the axis A in respect to the first frictional element 1, whereby the two conical frictional areas 10, 20 slide against each other. It is now the goal to delimit the occurring dynamic friction—by simultaneously securing static frictions as large as possible—such that the frictional forces counteracting the deflection of the said motor vehicle part are not too large. For this reason, on the one hand, a suitable selection of the material used for the two interacting frictional areas 10, 20 can contribute, in particular by using such material combinations in which the static friction is substantially larger, in particular many times greater than the dynamic friction.

Alternatively or additionally, the application of a (flowable) additional or intermediate medium Z is provided which is to be brought during a movement of the second frictional element 2 relatively to the first frictional element 1 between the each other facing frictional areas 10, 20 of the two frictional elements 1, 2 and which reduces the acting frictional forces. As lubricant for reduction of the frictional forces a suitable oil, for instance fluorsilicon-basis oil with ester additives can be used, and especially in combination with frictional areas 10, 20 consisting in each case of POM.

The additional or intermediate medium Z in form of a lubricant, thus consisting of a flowable material, is provided in the lower housing part 51, namely with such filling level that it at least reaches the lower side of the second frictional element 2 facing the housing bottom.

Figure 6B:
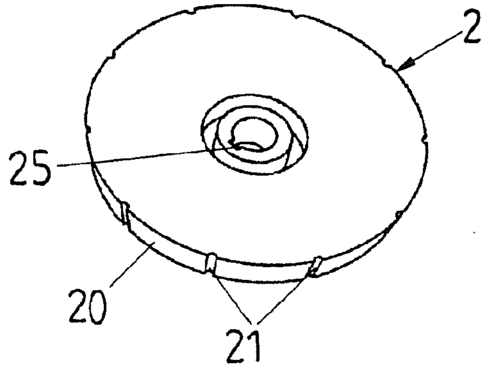
FIG 6B Prior Art
FIG. 6B a first variant of a braking element in form of a friction element for the locking device of FIG. 6A in a perspective illustration.
Figure 6C:
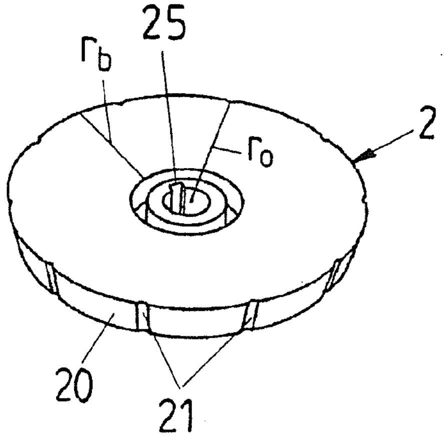
FIG 6C Prior Art
FIG. 6C a second variant of a braking element in form a friction element for the locking device of FIG. 6A in a perspective illustration.

In order to obtain during a relative movement, thus a rotational movement, of the second frictional element 2 relatively to the first frictional element 1 an sufficient amount of the flowable additional or intermediate medium Z between the frictional areas 10, 20 of the two frictional elements 1, 2 and herethrough to reduce the dynamic friction accordingly guiding channels 21 are provided along the frictional area 20 of the second frictional element 2, compare FIGS. 6B and 6C, along which the additional or intermediate medium can rise during a rotational movement of the second frictional element 2 so that it can reach between the two frictional areas 10, 20.

In the rest position of the second frictional element 2, thus if a deflected motor vehicle part has to be locked by the means of the locking device in a deflected position, the additional or intermediate medium Z is pressed out under the effect of the preload force of the elastic element 4 of the area between the frictional areas 10, 20 laying against each other so that the static friction is not affected.

According to the embodiment of the second frictional element 2 shown in FIG. 6*b* the channels 21 are formed as recesses (groves or narrow channels) in the frictional area 20 of the second frictional element 2 which extends essentially along the shaft 3 or its axis, but are thereby—according to the tilting of the frictional area 20—tilted into this direction.

In case of the variant shown in FIG. 6*c* the frictional area 20 of the second frictional element 2 consists of a number of spherical sections arranged one after the other along the circumferential direction of the disk-like frictional elements, which for instance represent a circular section respectively, those radius RB is smaller than the radius RO of the circular path along which the spherical sections are arranged one after each other. Through this, respective guiding channels 21 for the flowable additional or intermediate medium Z are formed on those locations, in which the spherical sections adjoin each other.

The kind and amount of provided additional medium Z is preferably to be selected such that on the one hand the second frictional element 2 does not swim if possible on the medium and on the other hand the additional medium Z cannot be, as described above, pushed out of the area of the frictional areas of the frictional elements 1, 2 assigned to each other in order to guarantee a static friction in the rest position.

Overall the following emerges based on the FIGS. 6*a* to 6*c*; if a displacement movement, which has led to a displacement of a motor vehicle part assigned to a locking device, for instance a vehicle door, ends, the shaft 3 does not rotate any further and the second frictional element 2 rests stationary opposite to the first frictional element 1, whereby the frictional areas 10, 20 lay on both sides against each other. Under the effect of the pre-load force caused by the elastic element 4 the intermediate medium Z present between the two frictional areas 10, 20 is then pushed away at least on those locations on which the frictional areas 10, 20 lay directly against each other. After a short intermediate time which is required for pushing away the intermediate medium Z, an increased (dry) static friction between the two frictional areas 10, 20 applies.

If the corresponding motor vehicle part is later moved again, for instance in order to deflected even further or to folded back into its original position, the static friction between the frictional areas 10, 20 of the locking device have to be overcome at first. As soon as the second frictional element 2 with its frictional area 20 is again moved relatively to the first frictional element 1 and its frictional area 10, that means rotated, it is secured by means of the guiding channels

21, which scan by a rotational movement of the second frictional element 2 step by step all areas of the frictional area 10 of the first frictional element 1, that the frictional area 10 of the first frictional element 1 is continuously wetted with the intermediate medium Z, over which then subsequently the frictional area 20 of the second frictional element 2 can slide with reduced dynamic friction.

As a result, it is possible by means of the previously described locking device, which has a first braking device comprising two braking elements in form of frictional elements 1, 2, to lock a deflectable part of a motor vehicle, as for instance as side door or a tail gate door, in a deflected position so that for instance gusts or unintended touching of the doors does not lead to a further deflection. Through this the collision with the obstacles present in the surrounding of the corresponding motor vehicle, as for instance a further motor vehicle, a wall, a lamp post or such, should be avoided.

The braking effect of the locking device can be overcome by a sufficiently strong impact force onto the corresponding motor vehicle door, whereby the braking engagement (static friction) between the two braking elements 1, 2 in form of frictional elements can be released by inducing a moment into the locking device, more exactly into a braking device, so that the two braking elements are not in a braking engagement and are movable towards each other (rotatable) under dynamic conditions.

In such a locking device a risk remains that it can come to a collision between a deflectable part of a motor vehicle, in particular in form of a motor vehicle door, and an obstacle present in its surrounding, if a person exerts a force onto the corresponding motor vehicle door, for instance because the person overlooked the obstacle or underestimated the impact force onto the door.

Figure 1:
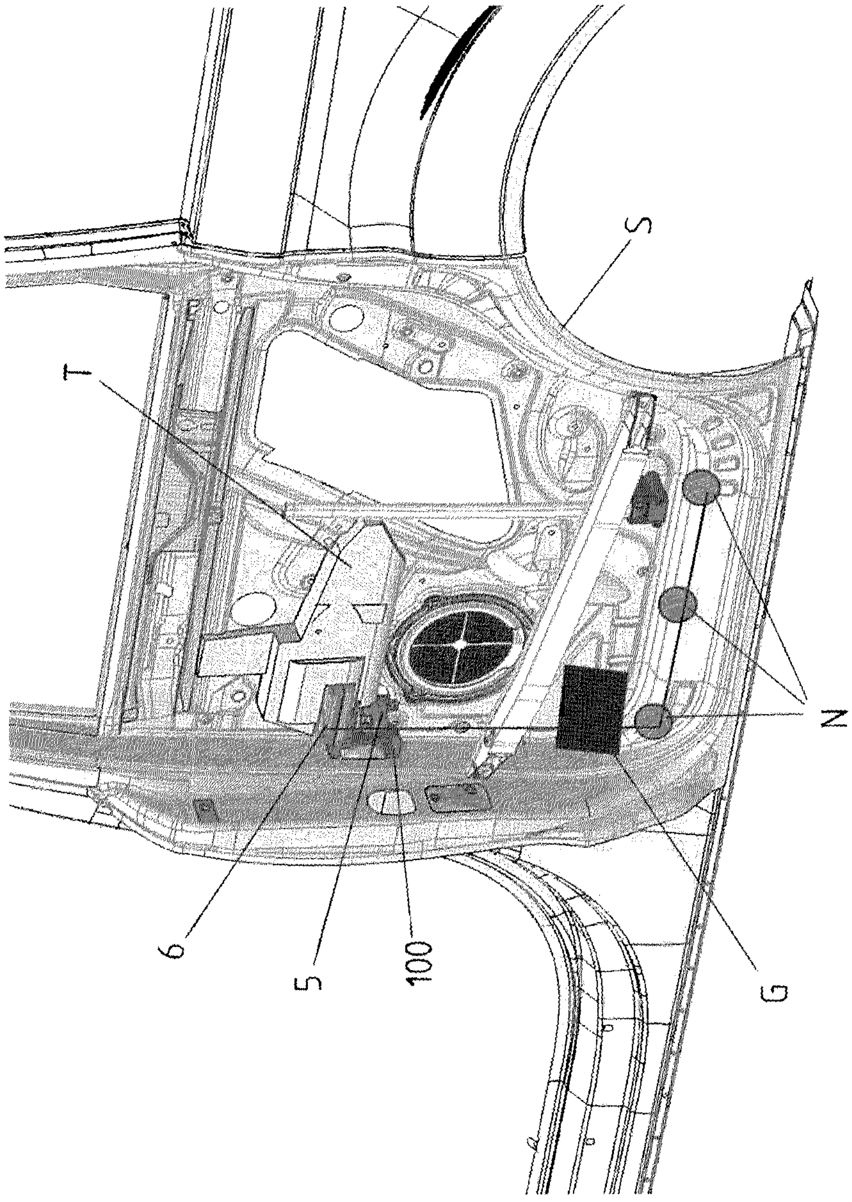
FIG. 1 A schematic illustration of the motor vehicle door with the locking device which comprises a braking device for locking the motor vehicle door in the deflected status and an extra-braking module.

For a remedy of this problem the locking device, shown in FIG. 1, in a built-in status in a motor vehicle door has besides a braking device 5, which can have for instance a build-up shown in the FIGS. 6A to 6C, an (optional) additional braking module 6.

The additional braking module 6, whose arrangement is going to be described subsequently by means of FIGS. 2 to 4B, comprises an actuator, which can be electrically actuated and/or operated, which is (electrically or optically) coupled to the sensors N, for instance in form of proximity sensors, which are arranged in the door structure T of a corresponding motor vehicle door (side door S).

The sensors N shown only schematically in FIG. 1 scan the surrounding of the door on the outside of the motor vehicle door S as facing the exterior the surrounding of the door in order to detect the approach of the door to a possible obstacle. They produce output signals (sensor signals) which are transferred to an evaluation unit, for instance in form of a door control unit G and are evaluated there. If the evaluation unit (door control unit G) recognizes through evaluation of the sensor signals that the risks of a collision of the door with an obstacle present in the surrounding exists, it activates the actuator or the additional braking module 6 which then causes a braking force or a braking moment which stops the actual movement of the vehicle door S in order to avoid a collision with an obstacle recognized by the sensors N. The evaluation unit in form of a door control G is for this reason interposed between the sensors N and the additional braking module 6.

The locking device, shown in FIG. 1, with a first braking device 5 and an additional braking module 6 is subsequently described in more detail by means of the FIGS. 2 to 4B, and mainly in particular with a view of the build-up structure of the additional braking modules 6. The first braking device 5 has basically a structure as explained by means of FIG. 6A to 6C.

Here the possible embodiments of the first braking device 5 are not restricted to the embodiment of the FIGS. 6A to 6C. It is of importance that the locking device comprises a first braking device 5, which allows a locking of a deflectable motor vehicle part, in particular a motor vehicle door in a deflected (displaced) position, whereby this locking can be released by the effect of the deflectable part so that this can be further displaced.

As a result, the first braking device 5 of the locking device serves also to lock a displaceable motor vehicle part in a deflected (displaced) position in a respective rest position; and the additional braking module 6 serves to brake an actual movement of a displaceable motor vehicle part and in particular to stop, if, as a consequence of this movement, a collision with an obstacle located in the surrounding of the flap is eminent.

Figure 2:
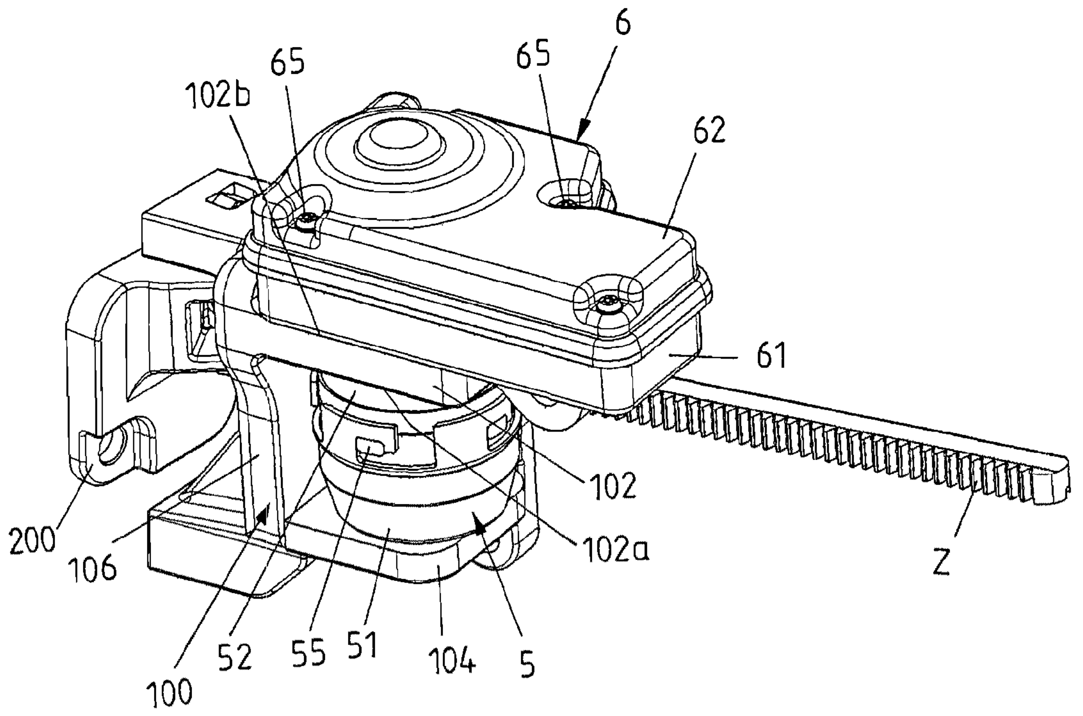
FIG. 2 a perspective illustration of the locking device of FIG. 1.
Figure 3A:
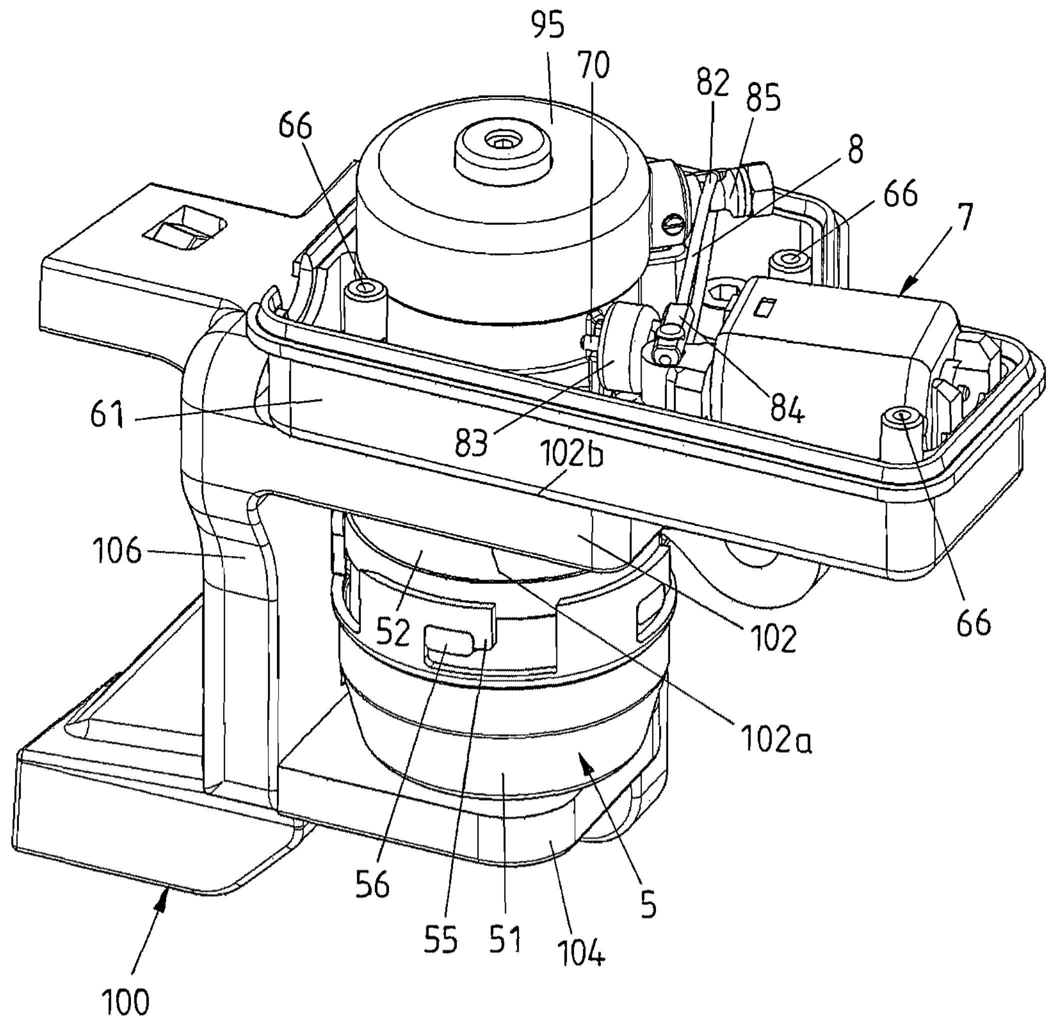
FIG. 3A a perspective illustration of a part of locking device of FIG. 2 whereby a housing upper part of the additional braking module is being moved.
Figure 3B:
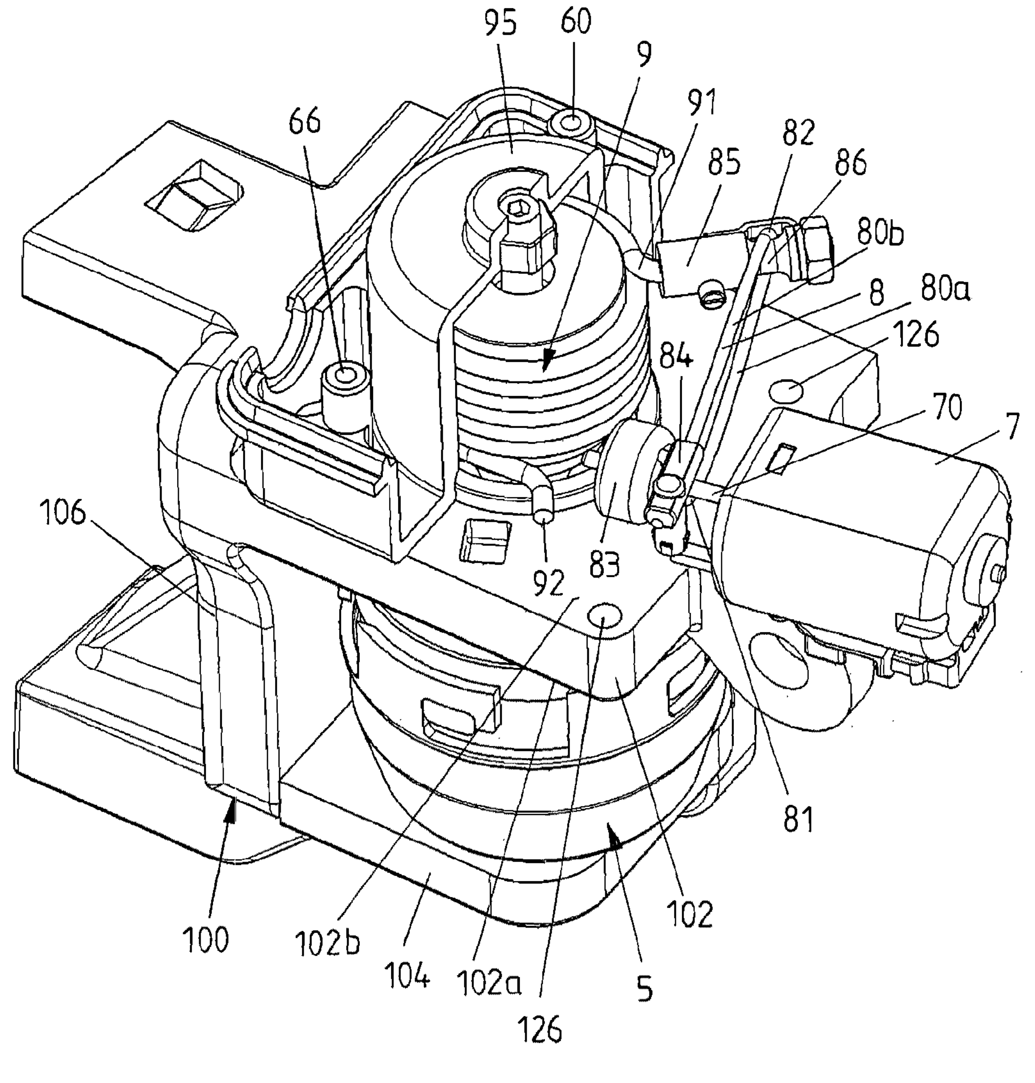
FIG. 3B the arrangement of FIG. 3A whereby a housing lower part of the additional braking module is shown partially open.

FIG. 2 shows—together with the FIGS. 3A, 3B, 4A and 4B—the locking device of FIG. 1 comprising a first braking device 5 and an additional braking module 6 together with the components of a door hinge, namely a support element 100 (door hinge angle) to be arranged on a motor vehicle door and a retaining member 200 (connecting angle) on the side of the outer body connected herewith under formation of a hinge, which is arranged in case of a front side door of a motor vehicle on its A-column and in case of the back side door of a motor vehicle its B-column.

Figure 4A:
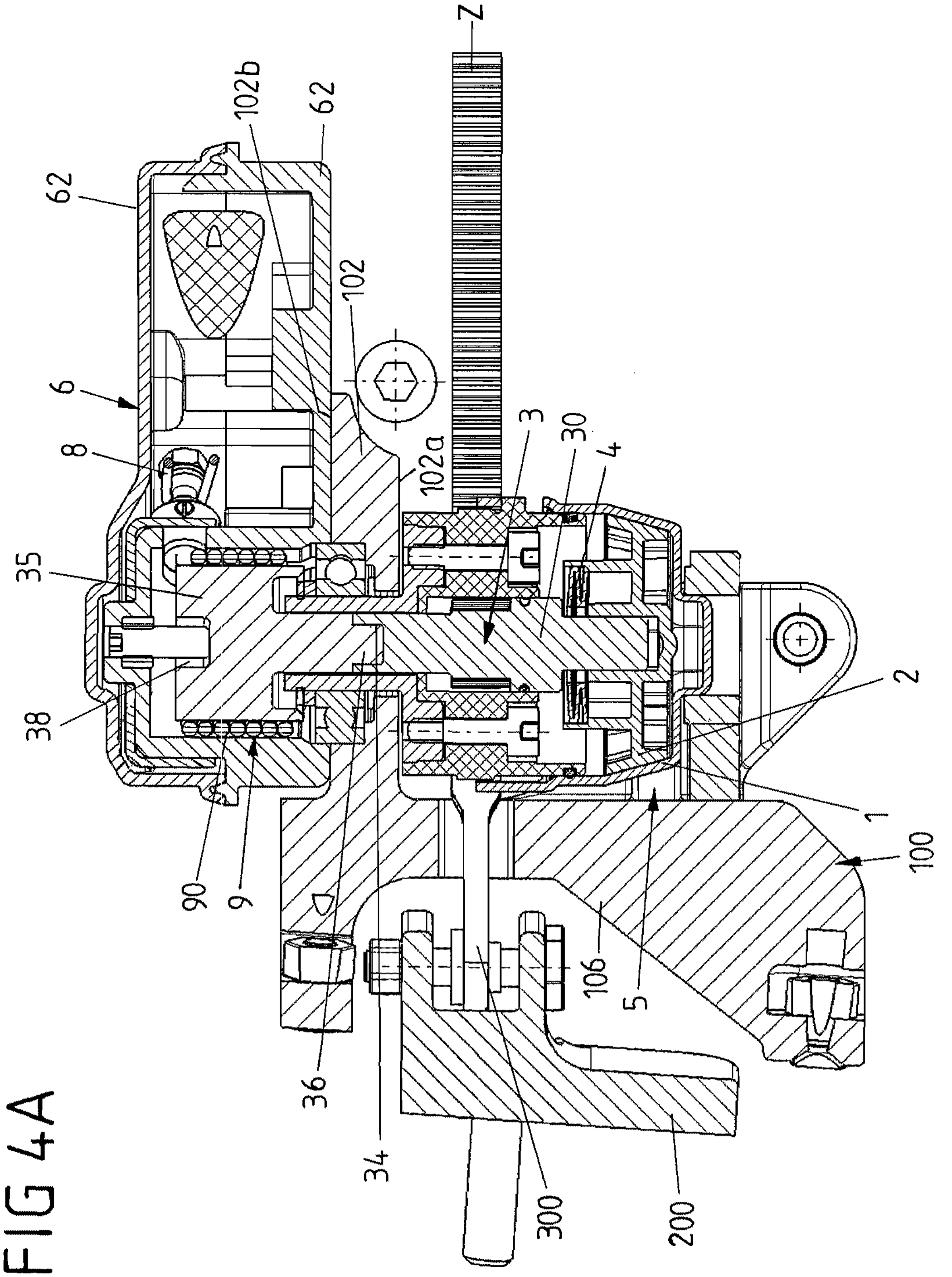
FIG. 4A a longitudinal section through the locking device of FIG. 2.

In detail, the door side retaining element 100 has a hinge area 106 via which by means of a hinge 300—compare FIG. 4A—a hinge-like connection occurs with a retaining member 200 on the side of the outer body.

Furthermore, for retaining the first braking device 5 and the additional module 6 is at least one retainer area 102 of the door side retaining member 100 provided. At present the first braking device 5 and the additional braking module 6 are arranged on each of the two each other facing surfaces 102_a_, 102_b_ of the retaining area 102. For this, attachment points, for instance in form of attachment openings 126, can be provided there. Alternatively, separate retaining areas can be provided for the first braking device 5 and the additional module 6, whereby the later one are at present furthermore supported by a supporting section 104, which is integrated as a separate building unit into the door side retaining member 100.

The first braking device 5 and the additional braking module 6 have in each case a housing 51, 52 or 61, 62 which are designed in two parts and consist in each case of a first housing part 51 or 61 (lower housing part) and a second housing part 52 or 62 (upper housing part).

The housing parts 51, 52 of the housing of the first braking device 5 are connected with each other in a bajonett-joint manner via form fit elements 55, 56 in form of latching elements. The housing parts 61, 62 of the housing of the additional module are attached to each other via bolding connections 65, 66.

Figure 4B:
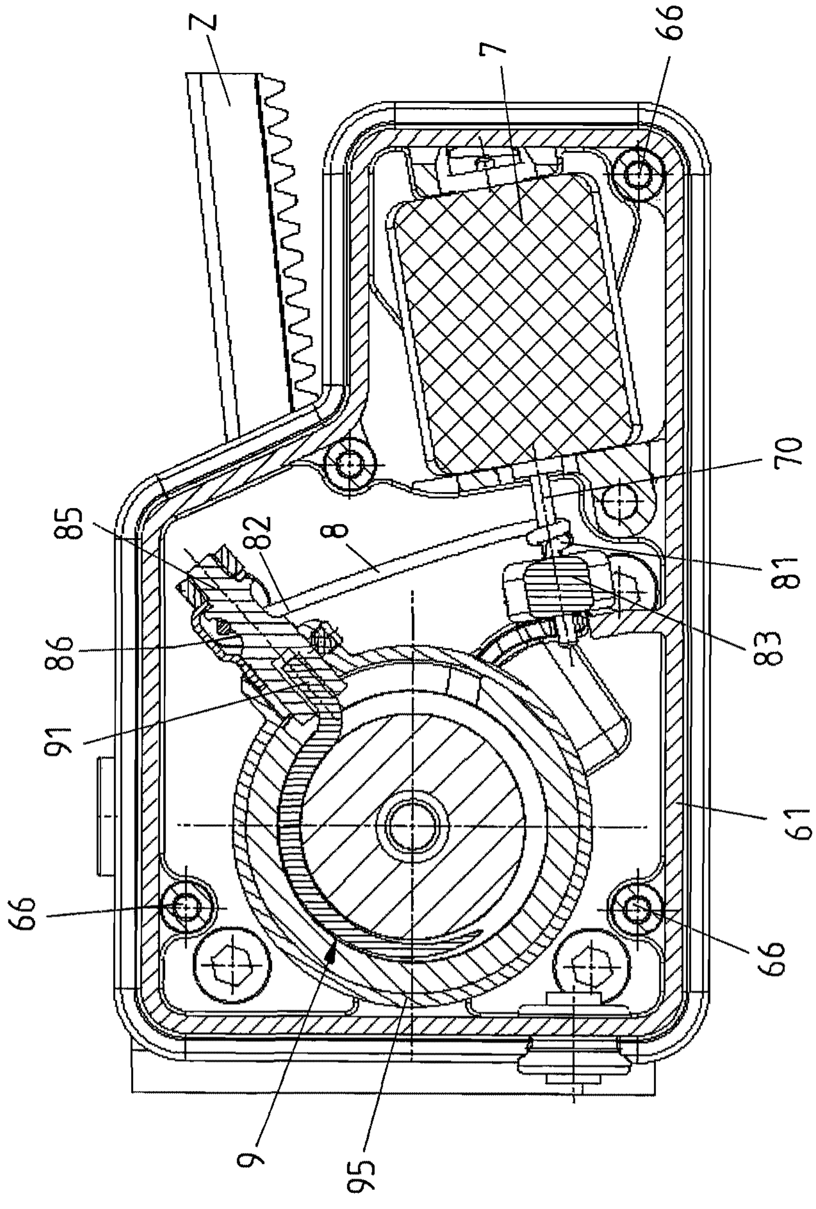
FIG. 4B a cross section through the locking device of FIG. 2 in the area of the additional braking module.

A rack Z serves at present, which interacts with the shaft 3, for instance via gear elements arranged to the shaft 3, for operating a shaft 3 running through the locking device, compare FIGS. 4A and 4B, by a displacement of a corresponding motor vehicle door, so that the shaft 3 rotates, It is further recognizable in the FIGS. 4A and 4B that the first braking device 5 of the locking device is based on the same braking principle as the braking device explained in detail by means of FIGS. 6A and to 6C and the corresponding braking elements 1, 2 in form of a frictional elements and elastic means 4 in form of a pressure spring for bracing the two frictional elements 1, 2.

As it in particular becomes apparent by means of the FIGS. 3A, 3B and 4A, 4B the additional braking module 6 comprises an actuator 7 as (arranged in the housing 61, 62) component, in the embodiment in form of an electric motor drive, which drives a drive shaft 70.

The actuator 7 in form of an electric motor drive is an actuator being operated electrically, which serves here for the production of the mechanical braking force (for instance by form or frictional locking). Instead of an actuator in form an electromotive drive, for instance also a lifting magnet or an actuator operable by further electrical means, can be provided for production of the braking force.

For transferring an output force or a corresponding output moment produced by the actuator 7 into a mechanically acting braking force, the actuator 7 is coupled via a coupling mechanism 8, 80 with a mechanical break 9, here in form of a wrap spring, which is wrapped around a shaft section 35 of the shaft 3 operatively connected to the corresponding deflectable motor vehicle part.

The coupling occurs in a manner that the actuator 7 acts via its drive shaft 70 onto a flexible pulling means 8, in form of a rope, namely in the embodiment in this manner that the section 81 of the flexible pulling means 8 is wrapped around the drive shaft 70 of the actuator 7. Through this when operating the actuator 7, more precise by supplying electrical current to the electrical engine forming the actuator 7, a pulling force is exerted onto the flexible pulling means 8 by acting of the actuator 7 via the drive shaft 70 onto the looped or wrapped pulling means section 81.

A further section 82 of the flexible pulling means 8 acts onto a control lever 85, which is fixated on one spring end 95 of a wrap spring 9, more exact it is slit onto it. By supporting the wrap spring 9 with its other spring end 92 on an arrester not shown in the figures, the activation of the actuator 7 causes due to its coupling with the one spring end 91 via the drive shaft 70, the flexible pulling means 8 and the control level 85 a contracting of the wrap spring 9. Through this a friction fit braking force is exerted onto the shaft section 35 and therefore the shaft 3 so that the shaft 3 is slowed down and the corresponding flap (motor vehicle door) is frictionally fit locked and is hindered to move further.

The flexible pulling means 8 in form of a rope is wrapped with its further section 82 around the control level 85, which has for this purpose a deflection section 86, such that the pulling means 8 extends between the actuator 7 and the braking means 9 in form of a wrap spring with two longitudinal pulling means section 80*a*, 80*b* which are distant from each other cross-wise to their extending directions. For this reason the flexible pulling means 8 is guided toward the control level 85 beginning with its first longitudinal pulling means section 80*a* and if guided back in direction of the actuator 7 with a second longitudinal pulling means section 80*b*.

Furthermore, the flexible pulling means 8 is kept with its section 81 wrapped around the shaft drive 70 of the actuator 7 by means of a fixating element 83 in form of a fixating drum arranged on said drive shaft 70. And the longitudinal pulling means section 80*b* guided back after deflection by the control level 85 is kept on a retaining element 84, which (in the area of actuator 7) if stationary arranged, but also not rotatable together with the drive shaft 70.

By guiding the flexible pulling means 8 so that between the actuator 7 and the braking means 9 in form of a wrap spring at least two pulling means sections 80*a*, 80*b* (side by side) extend at least sectionally, a transmission according to the block and tackle principle is obtained by the transmission from the actuator 7 to the braking means 9.

The additional braking module 6 is a module which is optionally depending on the desired equipment combinable with the first braking device 5 of the locking device.

On one hand, this is achieved since the additional module 6 can be fixed independently on the first braking device 5 on a retaining area 102, and namely in embodiment of one side 102*b* of the retaining area 102, which is facing a way from the side 102*a*, before which the first braking device 5 is arranged.

Furthermore, the shaft 3 coupled to the corresponding deflectable motor vehicle part, which reaches through the first braking device 3 and also through the additional braking module 6 with a respective shaft section 30 or 35, has in its shaft section 30 reaching through the first braking device 3, more exact on its end facing towards the additional module 6, an interface area 34. In this case it is a connecting area in form of a form fitting area, which allows a connection of the two shaft sections 30, 35 via a connecting area 36 in form a further form fit area provided on the other shaft section 35.

The additional module 6 can be coupled via the interface 35, 36 by means of the corresponding shaft section 35 optionally with the first braking device 5, more exact its shaft section 30, so that the shaft section 30, 35 form together a part of the shaft 3, to which the deflectable motor vehicle part, in particular in form of a vehicle door, is coupled.

As previously described, said shaft 3 interacts thereby via a gear element in form of a rack Z with the corresponding vehicle door, and namely on the shaft section 30 which corresponds to the first braking device 5 as a stationary part of the locking device. For this reason, a gear (pinion) can be provided on this shaft section 30 which engages with the rack.

If in a reduced equipment version an additional braking module 6 is disclaimed, no re-construction of the first braking device 5 is required; but it is only refrained from arranging the additional braking module 6 in front of the side 102*b* of the retaining area 102 facing a way from the first braking device 5. Herewith also the connection of the shaft section 35 on the side of the additional module with the shaft section 30 of the first braking device 5 via the interface 34, 36 is omitted.

Furthermore, the shaft section 35 on the side of the additional module is provided on its end facing a way from the first braking device 5 with a bearing position 38, via which said shaft section 35 is to be positioned, and which is formed geometrically analogue to the interface area 34 of the shaft section 30 arranged to the first braking device 5. Thus, by refraining from the additional braking module 6 the interface area 34 of the shaft section 30 of the first braking device 3 can be used as bearing position.

On its other end, the shaft 3 as already described by means of FIG. 6A to 6C is positioned in the housing 51, 52, more exact in the first, lower housing part 51 of the first braking device 5.

Deviating from the embodiment of the FIGS. 2 to 4B, according to which the actuator 7 acts (via the coupling mechanism 8, 85 and the wrap spring 9) independently on the braking elements 1, 2 of the first braking device 5 in a braking manner on the corresponding flap of a motor vehicle, namely on herewith coupled shaft 3, also an interaction of the actuator 7 via a suitable coupling mechanism on the one of the frictional elements 1, 2, in particular the second frictional element 2, can be provided.

In such a case, the actuator 7 can brake and prevent a displacement movement of a corresponding flap (motor vehicle door) by pressing the two frictional elements 1, 2 against each other and causing thereby static friction conditions under which the frictional elements 1, 2 lay against each other by reaction of a corresponding braking force. Through this the shaft 3 is slowed down, which is in connection with the second frictional element 2, and therefore also the flap (motor vehicle door) coupled to the shaft 3.

The activation of the actuator 7 (by providing a current) with the aim to brake a displacement of a corresponding motor vehicle part occurs according to an embodiment, in particular by applying onto a motor vehicle door as shown in FIG. 1, for a limited (short) time period, for instance of several seconds. In case, the actuator 7, the coupling mechanism 8, 85 and the corresponding braking means 9 are not designed in a selve-locking manner the braking effect is released after ending the activation of the actuator 7 so that the corresponding motor vehicle part (for instance a motor vehicle door as shown in FIG. 1) can be further deflected—in so far that the static friction produced by the locking device 5 is overcome. Due to the braking in the meantime and locking of the displaceable motor vehicle part by activating (providing a current) of the actuator 7, the vehicle passenger is however now aware that an obstacle is located in the surrounding so that the further displacement of the motor vehicle part occurs with adequate caution.

According to an embodiment it can be envisaged that after a first initial operation of the actuator 7 the sensors N used for activation, compare FIG. 1, cannot trigger for the time being (preliminary) a new initial operation of the actuator 7. This should allow a passenger to deflect the corresponding motor vehicle part also in the presence of an obstacle, optionally with a light touching of an obstacle. Furthermore, it can be provided that after a first activation of the actuator 7 by means of the sensors N a renewed activation can only then occur when the respective motor vehicle part has substantially further approached the respective obstacle so that now a strongly increased collision danger occurs or if the obstacle has taken a new position by self-movement.

Alternatively, it can be provided to construct the actuator 7, the coupling mechanism 8, 85 and/or the braking means 9 in a self-locking manner so that a braking effect caused after an activation of the actuator 7 can also be maintained if the actuator 7 does not operate, thus is not being provided with a current. In this case, the braking effect has to be actively compensated by an operation of an actuator 7 in the opposite direction, for what for instance is specific control element in the motor vehicle, in particular on the inside of the displaceable motor vehicle door, can be provided.

The invention claimed is:

1. A locking device for locking a displaceable motor vehicle part which is lockable by the locking device within a displacement range between a completely closed position and a completely opened position in a multitude of respective intermediate rest positions reached by displacement of the motor vehicle part, comprising:

a braking device with at least two braking elements which interacts in a braking manner in a respective intermediate rest position of the motor vehicle part in order to lock the motor vehicle part in the respective intermediate rest position; and an actuator which is adapted to be combined with the braking device and with which a displacement movement of the motor vehicle part is brakable to lock the motor vehicle part, wherein the actuator has its own breaking means associated with it and, independently from the braking device, is operatively connected with a component which is configured to be moved by displacement of the motor vehicle part so that a displacement movement of the displaceable motor vehicle part is brakable by the action of the actuator on the component via the breaking means.

2. The locking device according to claim 1, wherein the actuator is electrically operable and is coupled via a coupling mechanism to a mechanical braking mechanism which by activation of the actuator interacts with a corresponding component for braking a movement of the corresponding component.

3. The locking device according to claim 2, wherein the coupling mechanism comprises a flexible pulling mechanism.

4. The locking device according to claim 3, wherein the flexible pulling mechanism interacts via a pulling mechanism section onto the braking mechanism.

5. The locking device according to claim 4, wherein the flexible pulling mechanism interacts via a control lever onto the braking mechanism.

6. The locking device according to claim 3, wherein the flexible pulling mechanism is wrapped around a driving shaft operable by the actuator.

7. The locking device according to claim 3, wherein the flexible pulling mechanism is turned at least once so that for a transmission according to a block and tackle principle at least two pulling mechanism sections being spaced apart from each other extend at least sectionally between the actuator and the braking mechanism.

8. The locking device according to claim 2, wherein the mechanical braking mechanism is formed by a wrap spring.

9. The locking device according to claim 1, further comprising an interface of the braking device which is configured to couple the actuator with the braking device with which a displacement movement of the motor vehicle part is brakable to lock the motor vehicle part.

10. The locking device according to claim 9, wherein the interface comprises a shaft section, which reaches through the braking device, and wherein the interface is configured to tether an additional shaft section to which the actuator is operatively connected.

11. The locking device according to claim 1, wherein the locking device further comprises a shaft which is coupled to the displaceable motor vehicle part so that the shaft is rotated by a displacement of the motor vehicle part.

12. The locking device according to claim 11, wherein the braking device interacts with the shaft for locking the displaceable motor vehicle part.

13. The locking device according to claim 1, wherein the actuator is configured to be controlled for releasing a locking of the motor vehicle part.

14. The locking device according to claim 1, wherein the actuator is configured to be at least one of electrically actuated and operated.

15. The locking device according to claim 1, wherein the braking device comprises at least two frictional elements as the at least two braking elements which lie against each other in the respective rest position of the displaceable motor vehicle part under static friction conditions to lock the motor vehicle part, and which are configured to be moved relatively to each other by a displacement of the motor vehicle part under sliding friction conditions.

16. The locking device according to claim 1, wherein the actuator is part of an extra module which is configured to be arranged on the locking device.

17. The locking device according to claim 1, wherein the braking elements of the braking device are located outside of a power transmission chain via which the actuator is operatively connected to the component which is configured to be moved during displacement of the displaceable motor vehicle part.

18. The locking device according to claim 17, wherein the component movable during a displacement movement of the displaceable motor vehicle part is a rotatably mounted element.

19. A method for assembling a locking device for a displaceable motor vehicle part which is lockable by the locking device within a displacement range between a completely closed position and a completely opened position in a multitude of respective rest positions reached by displacement of the motor vehicle part, whereby a) a braking device is provided having at least two braking elements, which are arranged to interact in a braking manner in a respective intermediate rest position of the motor vehicle part for locking the motor vehicle part in the respective intermediate rest position and which are configured to be brought into a position without braking engagement by inducing a release force into the braking device, b) an additional braking module is provided, which comprises an electrically operable actuator and a coupling mechanism via which the actuator interacts with a component of the locking device for braking a displacement movement of the vehicle part, the component of the locking device being configured to be moved by displacement of the motor vehicle part, c) a determination is made whether the locking device is to be assembled in a first equipment variant which comprises the additional braking module in addition to the braking device or whether the locking device is to be assembled in a second equipment variant without the additional breaking module, and d) depending on the result of the determination either only the braking device or a combination of the braking device and the additional braking module is provided as the locking device.

* * * * *